(12) United States Patent
Tanaka et al.

(10) Patent No.: US 8,512,668 B2
(45) Date of Patent: Aug. 20, 2013

(54) METHOD OF MORE SIMPLE SEPARATION AND COLLECTION OF CARBON NANOTUBES

(75) Inventors: Takeshi Tanaka, Ibaraki (JP); Hiromichi Kataura, Ibaraki (JP); Huaping Liu, Ibaraki (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 314 days.

(21) Appl. No.: 13/068,842

(22) Filed: Jun. 22, 2010

(65) Prior Publication Data
US 2011/0280791 A1    Nov. 17, 2011

(30) Foreign Application Priority Data

Jun. 22, 2009  (JP) .................................. 2009-147557
Feb. 26, 2010  (JP) .................................. 2010-042629
Jun. 18, 2010  (JP) .................................. 2010-139405

(51) Int. Cl.
*D01F 9/12*    (2006.01)

(52) U.S. Cl.
USPC ......... 423/447.1; 423/461; 977/743; 977/845

(58) Field of Classification Search
USPC ....... 423/447.1–447.3, 445 B; 977/742–754, 977/842–848; 428/367
See application file for complete search history.

(56) References Cited

U.S. PATENT DOCUMENTS

2008/0023396 A1*  1/2008  Fugetsu ...................... 210/502.1
2010/0189626 A1*  7/2010  Tanaka et al. ................. 423/439
2010/0278714 A1* 11/2010  Tanaka et al. ............... 423/447.1

OTHER PUBLICATIONS

Tanaka, et al., Simple and Scalable Gel-Based Separation of Metallic and Semiconducting Carbon Nanotbues, Nano Letters 2009; 9(4): 1497-1500 (published online Feb. 25, 2009).*
Tanaka, et al., Simple and Scalable Gel-Based Separation of Metallic and Semiconducting Carbon Nanotbues—"Supporting Information," Nano Letters 2009; 9(4): 1497-1500, accessed online at http://pubs.acs.org/doi/suppl/10.1021/nl8034866/suppl_file/nl8034866_si_001.pdf on Jun. 9, 2012.*

* cited by examiner

*Primary Examiner* — Daniel C McCracken
(74) *Attorney, Agent, or Firm* — Wenderoth, Lind & Ponack, L.L.P.

(57) ABSTRACT

To provide a method for separating metallic CNT and semiconducting CNT by treating a CNT-containing gel or a CNT dispersion as combined with a gel, according to a physical separation means to thereby make semiconducting CNT exist in gel and metallic CNT exist in solution, in which the semiconducting CNT adsorbed by gel are collected in a more simplified manner not dissolving the gel.

A CNT-containing gel or a CNT dispersion combined with a gel is treated according to a physical separation means of a centrifugal method, a freezing squeezing method, a diffusion method or a permeation method, to thereby make semiconducting CNT exist in gel and metallic CNT exist in solution so that the metallic CNT and the semiconducting CNT are separated from each other, and further, a suitable eluent is made to react on the gel that adsorbs semiconducting CNT to elute the semiconducting CNT from the gel.

19 Claims, 7 Drawing Sheets

METHOD OF MORE SIMPLE SEPARATION AND COLLECTION OF CARBON NANOTUBES

TECHNICAL ART

The present invention relates to a method for efficiently separating and collecting metallic carbon nanotubes and semiconducting carbon nanotubes from carbon nanotubes (CNT) containing the two, and in particular to a method for collecting carbon nanotubes (CNT) adsorbed by gel after separation.

BACKGROUND ART

CNT have excellent properties of electric characteristics, mechanical strength and others, and studies and developments thereof as ultimate new materials are being made energetically. CNT are produced in various methods of a laser vaporization method, an arc discharge method, a chemical vapor deposition method (CVD method), etc. At present, however, they are produced only as a mixture morphology of metallic CNT and semiconducting CNT in any production methods.

In practical use, the properties of either one only of metallic or semiconducting CNT are needed in many cases, and therefore, the studies of separating and purifying metallic or semiconducting CNT alone from a CNT mixture are important ones that are desired to be solved as quickly as possible.

Heretofore, there are given some reports relating to separation of metallic CNT and semiconducting CNT from each other; however, all these involve problems in industrial production of metallic CNT and semiconducting CNT. The problems are as follows: (1) As the process includes complicated steps, it could not be automated. (2) The process takes a long time. (3) The process is not applicable to mass-production. (4) The process requires expensive equipment and chemicals. (5) Only either metallic CNT or semiconducting CNT could be obtained. (6) The collection rate is low.

For example, there are known a method of electrophoresing CNT dispersed with a surfactant, on a microelectrode (Non-Patent Reference 1); a method of using amines as a dispersant in a solvent (Non-Patent References 2, 3); and a method of selectively combusting semiconducting CNT with hydrogen peroxide (Non-Patent Reference 4); however, these could not still solve the problems of those mentioned above, especially in that the final product is limited to metallic CNT alone and the collection rate thereof is low.

There are known a method of separating semiconducting CNT by dispersing a mixture of semiconducting CNT and metallic CNT in a liquid, then selectively binding the metallic CNT to particles, and removing the metallic CNT bound to the particles (Patent Reference 1); a method of obtaining semiconducting CNT by treating CNT with a nitronium ion-containing solution followed by filtration and heat treatment to remove the metallic CNT from CNT (Patent Reference 2); a method of using sulfuric acid and nitric acid (Patent Reference 3); a method of obtaining semiconducting CNT by selectively moving and separating CNT through application of an electric field thereto followed by restricting the electro-conductivity range (Patent Reference 4).

These could not still solve the problems of those mentioned above, especially in that the final product to be obtained is limited to semiconducting CNT alone and the collection rate thereof is low.

There is known a method of separating CNT dispersed with a surfactant into metallic CNT and semiconducting CNT through density-gradient ultracentrifugation (Non-Patent Reference 5). The method involves some problems in that it requires an extremely expensive instrument of ultracentrifuge and takes a long time for ultracentrifugation, scaling up the ultracentrifuge itself is limited and a plurality of ultracentrifuges must be disposed in parallel, and therefore, automated treatment is difficult.

There is known a method of separation through ion-exchange chromatography by producing a CNT-nucleic acid composite comprising CNT bound to nucleic acid molecules (Patent Reference 5). However, this is problematic in that it requires an expensive synthetic DNA and the collection rate and the purity are not good since the separation accuracy is not so high.

There is known a report of trying separation of metallic and semiconducting CNT from each other by controlling the pH and the ionic intensity of a CNT solution dispersed with a surfactant to cause a different degree of protonation depending on the type of CNT, followed by applying an electric field to the resulting solution for the intended separation (Patent Reference 6). However, the method requires a step of pretreatment with a strong acid for pH and ionic intensity control of the suspended nanotube mixture prior to separation, and therefore, severe process control for the step is inevitable and finally, in addition, the separation of metallic and semiconducting CNT from each other could not be attained (Patent Reference 6, Example 4).

Also known is gellation of CNT themselves by the use of an ionic liquid (Patent Reference 7, Patent Reference 8); however, these are for the purpose of obtaining a gel of CNT themselves for enhancing the dispersibility of CNT and for processing CNT, not going any further.

As described in the above, all the conventional methods could not solve the above-mentioned problems, and it is desired to develop a method for separating metallic CNT and semiconducting CNT from CNT based on a novel idea.

The present inventors have made a start of a novel method of separation of metallic CNT and semiconducting CNT that differs from conventional methods, and have completed a invention mentioned below (Patent References 9, 10). The invention is as follows: A "CNT-containing gel" which is CNT previously dispersed and isolated in a gel is prepared, and an electric field is applied to the CNT-containing gel for gel electrophoresis whereupon only metallic CNT move but semiconducting CNT do not move at all as kept adsorbed by the original gel, and the semiconducting CNT and the metallic CNT are thereby separated from each other. This method is extremely excellent in that both metallic CNT and semi-conducting CNT are obtained and, in addition, the collection rate is high and the separation is attained within a short period of time, and further, using inexpensive equipment, the method is simple and enables large-scale mass-production (Patent Reference 9).

The above method has attained separation of metallic CNT and semiconducting CNT according to an electric separation means of applying an electric field to a CNT-containing gel. Apart from this, the present inventors have found that the separation could be possible by a physical separation means not by the electric separation means (Patent Reference 10). For example, when a CNT-containing gel is centrifuged, then the gel is crushed and is separated into a squeezed solution and the gel residue. In this stage, metallic CNT is fractionated in the solution fraction and semiconducting CNT is in the gel fraction. This method enables the separation in more simplified equipment than in the electrophoresis method, and facilitates scaling up and automation directed to mass-scale production.

However, in this method, CNT adsorbed by the gel must be taken out of the gel and collected for utilizing them for various purposes. Heretofore, for removing the gel from CNT adsorbed by gel, an operation of dissolving the gel by heating followed by separating the solution through centrifugation into a precipitate of CNT and the supernatant containing the dissolved gel must be repeated; and further, for completely removing the minor amount of the gel still remaining around the CNT, an operation of heating the system in an acid-containing solution to decompose it must also be repeated, and the process is extremely complicated (Non-Patent Reference 6).

[Patent Reference 1] JP-A 2007-31238
[Patent Reference 2] JP-A 2005-325020
[Patent Reference 3] JP-A 2005-194180
[Patent Reference 4] JP-A 2005-104750
[Patent Reference 5] JP-A 2006-512276
[Patent Reference 6] JP-A 2005-527455
[Patent Reference 7] JP-A 2004-142972
[Patent Reference 8] JP-A 2006-282418
[Patent Reference 9] JP-A 2008-285387
[Patent Reference 10] Japanese Patent Application No. 2007-318302
[Non-Patent Reference 1] Advanced Materials 18, (2006) 1468-1470
[Non-Patent Reference 2] J. Am. Chem. Soc. 127, (2005) 10287-10290
[Non-Patent Reference 3] J. Am. Chem. Soc. 128, (2006) 12239-12242
[Non-Patent Reference 4] J. Phys. Chem. B 110, (2006) 25-29
[Non-Patent Reference 5] Nature Nanotechnology 1, (2006) 60-65
[Non-Patent Reference 6] Nano Letters 9, (2009) 1497-1500

DISCLOSURE OF THE INVENTION

Problems that the Invention is to Solve

The present invention was made in consideration of the above-mentioned situation, and its object is to provide a method of separating metallic CNT and semiconducting CNT by treating a CNT-containing gel or a CNT dispersion combined with gel, according to a physical separation means to thereby make semiconducting CNT exist in gel and metallic CNT in solution, in which the semiconductor CNT adsorbed by gel are collected in a more simplified manner not dissolving the gel.

Means for Solving the Problems

The present inventors have assiduously studied for the purpose of solving the above-mentioned problems and have found that, in a method of separating metallic CNT and semiconducting CNT by treating a CNT-containing gel or a CNT dispersion combined with gel, according to a physical separation means, to thereby make semiconducting CNT exist in gel and metallic CNT in solution, when a suitable eluent is made to react on the gel that adsorbs semiconducting CNT, then the semiconducting CNT can be eluted from the gel not requiring any complicated step, or that is, the CNT can be collected (FIG. 1). "Physical separation means" as referred to herein includes those under mechanical load given thereto such as centrifugation (FIG. 1A) and freezing/thawing followed by squeezing (FIG. 1B), and in addition thereto, those based on a substance movement phenomenon such as diffusion (FIG. 1C) and permeation/adsorption (FIG. 1D), as well as operation of taking out the solution alone from a mixture of a gel and a solution. The separation principle of the invention is considered to be based on the knowledge that metallic CNT and semiconducting CNT differ from each other in the interaction thereof with surfactant and gel, or that is, semiconducting CNT having strong interactivity with gel are separated in gel while metallic CNT having strong interactivity with surfactant are separated in solution.

The present invention has been made on the basis of the above novel finding.

Specifically, the application provides the following invention:

<1> A method for separating and collecting metallic carbon nanotubes and semiconducting carbon nanotubes, which comprises centrifuging a carbon nanotubes-containing gel with a centrifuge to give a solution fraction containing metallic carbon nanotubes in the solution eluted from the gel through centrifugation, and a gel fraction containing semiconducting carbon nanotubes in the gel compressed by centrifugation, separating the two from each other, and further making an eluent react on the separated gel fraction to thereby elute the semiconducting carbon nanotubes from the gel adsorbing the semiconducting carbon nanotubes (see FIG. 1A).

<2> A method for separating and collecting metallic carbon nanotubes and semiconducting carbon nanotubes, which comprises freezing a carbon nanotubes-containing gel, then squeezing the gel after thawed, to separate it into a solution containing metallic carbon nanotubes in the solution eluted from the gel, and a gel containing semiconducting carbon nanotubes in the compressed gel, and further making an eluent react on the separated gel to thereby elute the semiconducting carbon nanotubes from the gel adsorbing the semiconducting carbon nanotubes (see FIG. 1B).

<3> A method for separating and collecting metallic carbon nanotubes and semiconducting carbon nanotubes, which comprises dipping a carbon nanotubes-containing gel in a solution to thereby give a metallic carbon nanotubes-containing solution formed by diffusing and eluting metallic carbon nanotubes in the solution from the gel, and a semiconducting carbon nanotubes-containing gel, then separating the two from each other, and further making an eluent react on the separated gel to thereby elute the semiconducting carbon nanotubes from the gel adsorbing the semiconducting carbon nanotubes (see FIG. 1C).

<4> A method for separating and collecting metallic carbon nanotubes and semiconducting carbon nanotubes, which comprises mixing a gel and a carbon nanotube dispersion to thereby make semiconducting carbon nanotubes permeate into the gel and concentrate metallic carbon nanotubes in solution, then taking out and separating the metallic carbon nanotubes-containing solution from the carbon nanotubes-containing gel, and further making an eluent react on the gel from which the solution has been separated, thereby eluting the semiconducting carbon nanotubes from the gel adsorbing the semiconducting carbon nanotubes (see FIG. 1D-1).

<5> A method for separating and collecting metallic carbon nanotubes and semiconducting carbon nanotubes, which comprises making a carbon nanotube dispersion pass through a gel to thereby make the gel adsorb semiconducting carbon nanotubes, then eluting and separating the unadsorbed metallic carbon nanotubes, and further making an eluent react on the gel from which the solution has been separated, thereby eluting the semiconducting carbon nanotubes from the gel adsorbing the semiconducting carbon nanotubes (see FIG. 1D-2).

<6> The method for separating and collecting metallic carbon nanotubes and semiconducting carbon nanotubes as described in any one of <1> to <5>, wherein in the elution step of eluting the semiconducting carbon nanotubes from the gel, the eluent contains a surfactant of a type that differs from that of the surfactant used for separation.

<7> The method for separating and collecting metallic carbon nanotubes and semiconducting carbon nanotubes as described in <6>, wherein the surfactant contained in the eluent is sodium deoxycholate, sodium cholate, sodium dodecylbenzenesulfonate, Tween-20 or Triton X-100.

<8> The method for separating and collecting metallic carbon nanotubes and semiconducting carbon nanotubes as described in any one of <1> to <5>, wherein in the elution step of eluting the semiconducting carbon nanotubes from the gel, the eluent contains a surfactant of the same type as that of the surfactant used for separation.

<9> The method for separating and collecting metallic carbon nanotubes and semiconducting carbon nanotubes as described in <8>, wherein the surfactant contained in the eluent has a higher concentration than that of the surfactant used for separation.

<10> The method for separating and collecting metallic carbon nanotubes and semiconducting carbon nanotubes in <1> to <3>, wherein the carbon nanotubes-containing gel is prepared by previously dispersing and solubilizing carbon nanotubes with a surfactant, and then ultrasonically treating them to make the carbon nanotubes exist in the gel in a dispersed and isolated state.

<11> The method for separating and collecting metallic carbon nanotubes and semiconducting carbon nanotubes in <4> or <5>, wherein the carbon nanotube dispersion is prepared by previously dispersing and solubilizing carbon nanotubes with a surfactant, and then ultrasonically treating them to make the carbon nanotubes dispersed and isolated in the dispersion.

<12> The method for separating and collecting metallic carbon nanotubes and semiconducting carbon nanotubes in <10> or <11>, wherein the surfactant is an anionic surfactant or an amphoteric surfactant.

<13> The method for separating and collecting metallic carbon nanotubes and semiconducting carbon nanotubes in <12>, wherein the anionic surfactant is alkyl sulfate salt, sodium dodecanesulfonate, dodecanoylsarcosine sodium, sodium dodecanoate, or sodium cholate.

<14> The method for separating and collecting metallic carbon nanotubes and semiconducting carbon nanotubes in <13>, wherein the alkyl sulfate salt is sodium dodecyl sulfate, sodium decyl sulfate or sodium tetradecyl sulfate.

<15> The method for separating and collecting metallic carbon nanotubes and semiconducting carbon nanotubes in <12>, wherein the amphoteric surfactant is n-dodecylphosphocholine.

Advantage of the Invention

According to the invention, CNT adsorbed by gel can be collected, not dissolving the gel. Accordingly, CNT alone can be collected in a simplified manner from CNT adsorbed by gel. In addition, not only the gel can be reused directly as it is, but also adsorption and desorption by gel can be continuously repeated, which brings about simplification and automation of separation, and as a result, the separation cost may be greatly reduced. It may be said that the method is an effective method for separating metallic CNT and semiconducting CNT from CNT.

BRIEF DESCRIPTION OF THE DRAWINGS

The file of this patent contains at least one drawing executed in color. Copies of this patent with the color drawing will be provided by the Patent and Trademark Office upon request and payment of the necessary fee.

BEST MODE FOR CARRYING OUT THE INVENTION

Figure 1:
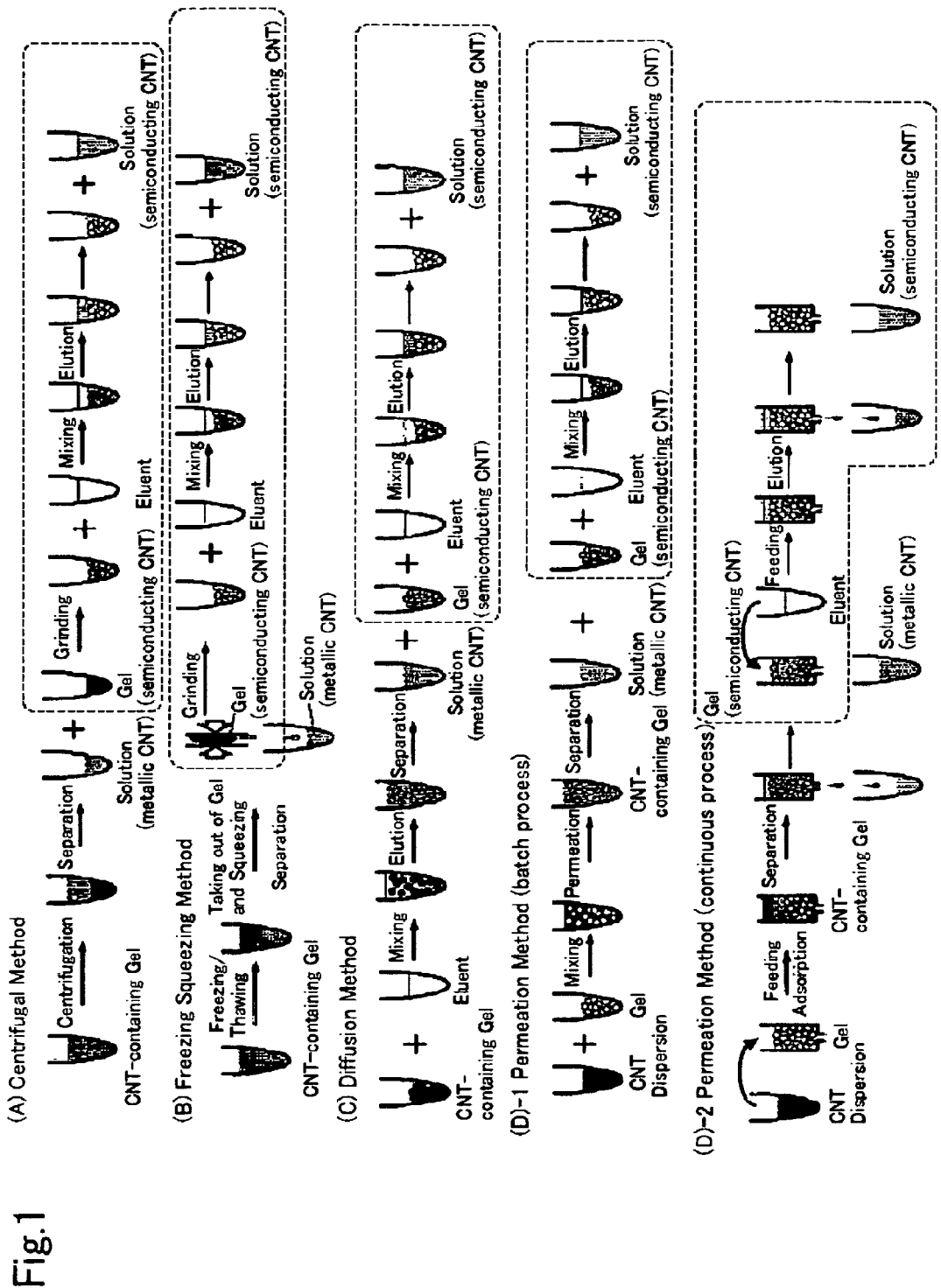
FIG. 1 This is a view showing a physical means for separating metallic CNT and semiconducting CNT from gel.

The present invention is a method directed to a mixture containing metallic CNT and semiconducting CNT (hereinafter this may be simply referred to as CNT) for separating and collecting the metallic CNT and the semiconducting CNT.

CNT to be separated here are not defined in point of the production method, the shape (diameter and length) and the structure (single-walled, double-walled, etc.) thereof, and the invention may be directed to any CNT for separating metallic CNT and semiconducting CNT.

In general, the structure of CNT is primarily defined by a chiral index composed of a pair of two integers (n, m). Metallic CNT and semiconducting CNT as referred to in the invention are classified from carbon nanotubes in accordance with the electric properties thereof. Metallic CNT are defined as those having a chiral index of n−m=(multiple of 3); and semiconducting CNT are as the others (having a chiral index, n−m=not multiple of 3) (Non-Patent Reference 6: Riichiro Saito & Hisanori Shinohara, "Basis and Application of Carbon Nanotubes" by Baifu-kan, pp. 13-22).

[Regarding Preparation of CNT Dispersion]

Synthesized CNT make, in general, bundles comprised of tens to hundreds CNT of both metallic and semiconducting CNT. Prior to separating them into metallic CNT and semiconducting CNT, the bundles must be dispersed and solubilized as individual CNT isolated from each other, and must be kept stable for a long period of time.

A mixture of metallic CNT and semiconducting CNT is added to a solution to which a surfactant has been added as a dispersant, and fully treated with ultrasonic whereby the CNT are individually dispersed and isolated from each other. The dispersion contains dispersed isolated CNT, CNT still in the form of bundles as neither dispersed nor isolated, amorphous carbon as a side product, and metal catalyst, etc.

After the ultrasonic treatment, the dispersion is centrifuged, whereby the CNT bundles, amorphous carbon and metal catalyst are precipitated, and the isolated CNT forming a micelle with a surfactant can be collected in the supernatant. The obtained supernatant is the sample for separation of metallic CNT and semiconducting CNT.

Water is most preferred as the solvent in preparing the CNT dispersion. From this viewpoint, water is used in preparing the CNT dispersion.

As the surfactant, herein usable is any of anionic surfactants, cationic surfactants, amphoteric surfactants and nonionic surfactants.

As the anionic surfactant, preferred are alkyl sulfate-type surfactants having from 10 to 14 carbon atoms such as alkyl sulfate salts, etc.; as well as dodecanesulfonic acid, dodecanoylsarcosine, dodecanoic acid, cholic acid, and their salts such as sodium salts, etc. The alkyl sulfate salts include, for example, sodium dodecylsulfate, sodium decyl sulfate, sodium tetradecyl sulfate, etc. As the amphoteric surfactant, preferred are n-dodecylphosphocholine, etc. These surfactants may be mixed for use herein. They may be combined with any other surfactant. The surfactant to be combined with them may be any of anionic surfactants, cationic surfactants, amphoteric surfactants, nonionic surfactants, and also other dispersants such as high-molecular polymers, DNA, proteins, etc. The concentration of the dispersant such as surfactant may vary depending on the type and the concentration of CNT to be used and the type of the dispersant to be used, but in general, its final concentration could be from 0.01% to 25%.

According to the method, the concentration of CNT in the dispersion can be from 1 μg/ml to 10 mg/ml, preferably from 0.1 mg/ml to 1 mg/ml.

[Regarding Gel to be Used]

The material to constitute the gel for use for the CNT-containing gel may be conventional known agarose, arylamide, starch or the like; and a gel prepared by gelling them, such as agarose gel, acrylamide gel, starch gel or the like is used. As the invention is based on the behavior difference between metallic CNT and semiconducting CNT in a gel containing them, the above-mentioned substances produce favorable results, and from this viewpoint, the substances are recommended.

In general, the gel concentration of the CNT-containing gel is preferably from 0.01% to 25% as the final concentration thereof.

The process of preparing the "CNT-containing gel" that contains CNT as dispersed in the gel includes a method of mixing a CNT dispersion and a melting solution of a gel such as agarose followed by cooling for gelling it; a method of dipping a gel or a dried gel in a CNT dispersion to thereby make CNT permeate into the gel; a method of electrically introducing a CNT dispersion into a gel; a method of mixing a CNT dispersion and acrylamide followed by adding a polymerization initiator for gel formation, etc. Any other known method than those may be suitably employed here for introducing CNT into gel.

The method for separating and collecting metallic CNT and semiconducting CNT of the invention comprises separating the CNT-containing gel prepared in the manner as above, according to a physical separation means into metallic CNT and semiconducting CNT, followed by eluting (collecting) the semiconducting carbon nanotubes from the gel containing semiconducting carbon nanotubes.

The physical separation means for use in the invention includes (A) a centrifugal method, (B) a freezing squeezing method, (C) a diffusion method, and (D) a permeation method; and these methods may be suitably combined in any desired manner.

The invention is described below for the individual methods.

(A) Method According to Centrifugation (FIG. 1A):

Using a centrifuge, a centrifugal force of approximately from $10^4$ to $10^5$ times the gravitational force is applied to a CNT-containing gel to squeeze the gel thereby giving a solution fraction containing metallic CNT in the solution eluted from the gel and a gel fraction containing semiconducting CNT in the compressed gel, and then the two are separated from each other, and further, a suitable eluent is made to react on the gel that adsorbs the semiconducting CNT to thereby elute the semiconducting CNT from the gel.

The centrifugal acceleration in centrifuging a CNT-containing gel may be determined depending on the situation, but is, for example, from $10^4 \times g$ to $10^5 \times g$ or so. The temperature may also be determined depending on the situation, but is, for example, from 4 to 30° C. or so.

The ratio in separating the solution fraction containing metallic CNT in the solution eluted from the gel and a gel fraction containing semiconducting CNT in the compressed gel may differ depending on the gel concentration to be used, the time for centrifugation and the gravitational acceleration. For example, in case where 0.4 ml of a CNT-containing gel that contains 0.4% agarose gel is centrifuged under 16,000×g, the result is that the solution fraction is 0.27 ml and the gel fraction is 0.13 ml after 1 hour, the solution fraction is 0.30 ml and the gel fraction is 0.10 ml after 2 hours, and the solution fraction is 0.32 ml and the gel fraction is 0.08 ml or so after 3 hours.

(B) Method According to Freezing Squeezing (FIG. 1B):

A CNT-containing gel is frozen, then thawed and squeezed to thereby separate it into a solution containing metallic CNT in the solution eluted from the gel and a gel containing semiconducting CNT in the compressed gel, and further, a suitable eluent is made to react on the gel that adsorbs the semiconducting CNT to thereby elute the semiconducting CNT from the gel.

The gel changes its network structure in the freezing and thawing step, and under the condition, a liquid part may be squeezed out from the gel by a force on a level of a pinching force by fingers, and not using a centrifuge, the gel may be separated into metallic CNT and semiconducting CNT.

Regarding the temperature for freezing and thawing the CNT-containing gel, concretely, the freezing temperature may be from −80° C. to −20° C. or so, and the thawing temperature may be room temperature (15° C. to 25° C.) or so.

For squeezing it, the frozen and thawed gel may be taken out into a wrap, and may be directly pushed, or as the case may be, it may be pinched with fingers and squeezed, or the vessel with the gel therein may be centrifuged with a centrifuge to squeeze it by a centrifugal force.

The ratio of the solution containing metallic CNT eluted from the gel and the gel containing compressed semiconducting CNT may vary depending on the condition such as the gel concentration to be used; and in general, the ratio may be 3/1 or so by volume.

(C) Method According to Diffusion (FIG. 1C):

When a CNT-containing gel is dipped in a solution, metallic CNT can be diffused and eluted from the gel into the solution. Based on this characteristic feature, the gel is separated into a metallic CNT-containing solution and a semiconducting CNT-containing gel, and further, a suitable eluent is made to react on the gel that adsorbs the semiconducting CNT to thereby elute the semiconducting CNT from the gel.

As the solution in which the CNT-containing gel is dipped, usable is, for example, a solution containing the above-mentioned surfactant added thereto, such as an aqueous solution of an alkyl sulfate salt.

The ratio of the CNT-containing gel and the solution may vary depending on the concentration of CNT, but is, for example, from an equivalent amount to 10 times amount or so.

The time for elution may vary depending on the concentration and the size of the gel to be used, but is, for example, from 30 minutes to 20 hours or so.

(D)-1 Method According to Permeation (Batch Process) (FIG. 1D-1):

A gel is dipped in a CNT dispersion to give a gel selectively taking semiconducting CNT into the gel and a dispersion containing the remaining metallic CNT, and the two are separated from each other, and further, a suitable eluent is made to react on the gel that adsorbs the semiconducting CNT to thereby elute the semiconducting CNT from the gel.

In the permeation step of selectively taking semiconducting CNT into the gel, a surfactant may be added to the gel so that the dispersed CNT do not aggregate.

The concentration and the composition of the gel may be the same as those of the gel simulated by removing CNT from the CNT-containing gel.

The ratio of the gel and the CNT dispersion may be from an equivalent amount to 10 times amount or so.

The time to be taken for permeation may vary depending on the concentration and the size of the gel to be used, but is, for example, from 30 minutes to 20 hours or so.

(D)-2 Method According to Permeation (Continuous Process) (FIG. 1D-2):

A carbon nanotube dispersion is led to pass through a gel to thereby make semiconducting CNT permeate into the gel to be adsorbed by the gel, then the unadsorbed metallic CNT are eluted and separated, and further a suitable eluent is led to pass through the gel that adsorbs the semiconducting CNT to desorb and thereby elute the semiconducting CNT from the gel.

In the permeation/adsorption step of selectively taking semiconducting CNT into the gel, a surfactant may be added to the gel so that the dispersed CNT do not aggregate.

The concentration and the composition of the gel may be the same as those of the gel simulated by removing CNT from the CNT-containing gel.

For efficient adsorption and desorption to and from the gel, the size of the gel may be reduced to increase the effective surface and the effective volume whereby the separation time may be shortened. The time for permeation, adsorption and desorption may vary depending on the concentration and the size of the gel to be used, but may be a few seconds or so.

In the step of desorbing CNT from gel in the above-mentioned methods (in FIG. 1, the part surrounded by the dotted line), preferably, the size of the gel is reduced for promoting effective desorption.

Also preferably, the eluent for use for desorption contains a surfactant of a type different from that of the surfactant used for separation. Specific examples of the surfactant to be contained in the eluent include sodium deoxycholate, sodium cholate, sodium dodecylbenzenesulfonate, Tween-20, Triton X-100, etc. The eluent for use for desorption may be a solution containing a surfactant of the same type as that of the surfactant for use for separation. For example, there is mentioned SDS. In this case, the concentration of the surfactant to be contained in the eluent for use for separation is preferably higher than that of the surfactant used for separation. The surfactant used for separation is the surfactant used in preparing the above-mentioned CNT dispersion.

To estimate the proportion of metallic CNT and semiconducting CNT, UV-visible range-near IR absorptiometry is employed.

Figure 2:
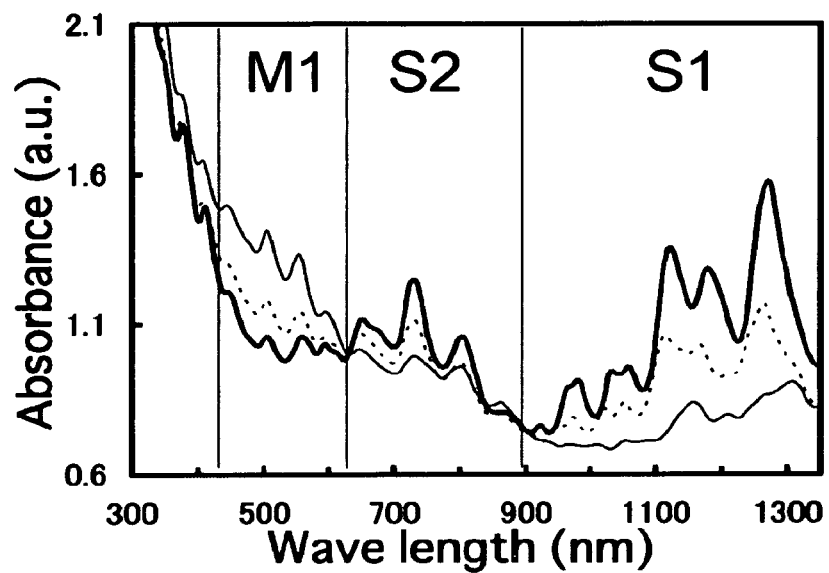
FIG. 2 This is a view showing photoabsorption spectra of CNT separated according to a centrifugal method (Example 1, Hipco-CNT). The dotted line indicates before separation; the thin line indicates a unadsorbed fraction; and the thick line indicates an adsorbed fraction.

The result in a case where CNT produced according to a HiPco method (HiPco-CNT, diameter 1.0±0.3 nm) are used is described (FIG. 2). The absorption wavelength range referred to as M1 (about 450 to 650 nm) is from metallic CNT. The three absorption wavelength ranges of S1 (about 900 nm or more), S2 (about 650 to 900 nm) and S3 (about 450 nm or less) are from semiconducting CNT. Here the ratio of metallic CNT and semiconducting CNT is estimated from the ratio of the peak size in M1 and S2. Depending on the mean diameter of the CNT analyzed, the absorption wavelength range (M1, S1, S2, S3) varies. When the mean diameter is smaller, then the range is shifted to the short wavelength side; and when the mean diameter is larger, it is shifted to the long wavelength side.

EXAMPLES

The invention is described in more detail with reference to the following Examples, to which, however, the invention should not be limited.

Example 1

A CNT-containing gel was centrifuged to separate it into CNT adsorbed by gel and an eluted CNT solution, and then the CNT adsorbed by gel was desorbed and collected with an aqueous DOC solution.

[Preparation of CNT Dispersion]

An aqueous 2% sodium dodecylsulfate (SDS) solution (20 ml) was added to 6 mg of Hipco-CNT (by CNI, CNT produced through chemical vapor deposition, having a diameter of 1.0±0.3 nm). The solution was ultrasonically treated using a tip-type ultrasonic homogenizer (Taitec's VP-15; tip diameter 12 mm), while cooled in cold water at an output level of 3 for 4 hours.

The ultrasonically-treated dispersion was ultra-centrifuged (415,000×g, 15 minutes, 22° C.), and 80% of the supernatant was collected.

[Preparation of CNT-Containing Gel]

A low-melting-point agarose was added to water to be 0.6%, and completely dissolved with a microwave oven, and the resulting solution and the above-mentioned CNT dispersion of the same amount (0.5 ml) each were quickly mixed in a microtube (capacity 1.5 ml) (in this, the final concentration of agarose was 0.3%). The mixture was left cooled at room temperature and gelled to prepare a CNT-containing gel.

[Separation According to Centrifugal Method]

The CNT-containing gel prepared in the above was centrifuged (16,000×g, 1 hour, 25° C.). Through the centrifugation, the gel was compressed and gathered at the bottom of the microtube, and a solution was eluted in the top thereof. The solution contained CNT not adsorbed by the gel (unadsorbed fraction).

[Elution of CNT Adsorbed by Gel]

The gel adsorbing CNT after the separation was ground finely, then washed with an aqueous 1% SDS solution, and the solution was removed. After washed, the gel still adsorbed CNT. An aqueous 1% sodium deoxycholate (DOC) solution (1 ml) was added to the gel and gently stirred whereby CNT were desorbed into a solution and were thus collected (adsorbed fraction).

[Photoabsorption Spectrometry]

Thus collected, the unadsorbed fraction solution and adsorbed fraction solution were suitably diluted with an aqueous 1% SDS solution (or pure water), and then analyzed for photoabsorption spectrometry. The results are shown in FIG. 2. In the drawing, "dotted line", "thin line" and "thick line" each show the spectrum before separation, unadsorbed fraction and adsorbed fraction, respectively.

As compared with the ratio of the absorption by semiconducting CNT (S2) and the absorption by metallic CNT (M1) in the spectrum of the CNT dispersion before separation, the proportion of M1 of metallic CNT significantly increased in the spectrum of the unadsorbed fraction after separation, and this confirms the separation of metallic CNT. On the contrary, the proportion of the absorption by semiconducting CNT (S2) increased in the adsorbed fraction, and this confirms the separation of semiconducting CNT.

The above results clearly show that, when DOC is used as the eluent, then CNT adsorbed by the gel can be desorbed and collected not dissolving the gel.

Example 2

This is the same experiment as in Example 1 except that a different type of CNT (Arc-CNT, by Meijo Nanocarbon, having a diameter of 1.4±0.1 nm) was used. The CNT adsorbed by the gel and the eluted CNT solution were separated, and then the CNT adsorbed by the gel was desorbed and collected with an aqueous DOC solution.

Figure 3:
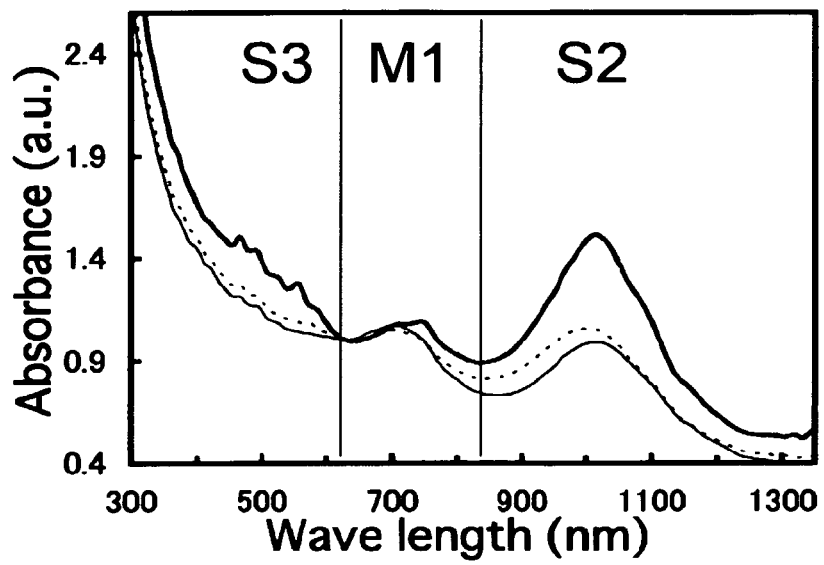
FIG. 3 This is a view showing photoabsorption spectra of CNT separated according to a centrifugal method (Example 2, Arc-CNT). The dotted line indicates before separation; the thin line indicates a unadsorbed fraction; and the thick line indicates an adsorbed fraction.

The photoabsorption spectral patterns of the unadsorbed fraction and the adsorbed fraction are shown in FIG. 3. In the drawing, "dotted line", "thin line" and "thick line" each show the spectrum before separation, unadsorbed fraction and adsorbed fraction, respectively. This Example clearly shows that, even when a different type of CNT are used, the CNT adsorbed by the gel can be desorbed and collected not dissolving the gel.

Example 3

A CNT-containing gel was frozen, thawed and squeezed to separate it into CNT adsorbed by gel and an eluted CNT solution, and then the CNT adsorbed by gel was desorbed and collected with an aqueous DOC solution.

The process is the same as in Example 2 except that the step of [Separation according to Centrifugal Method] was changed to a step of [Separation according to Freezing Squeezing Method].

[Separation According to Freezing Squeezing Method]

The CNT-containing gel prepared in the above was frozen at −20° C. for 1 hour, then thawed at room temperature, and centrifuged (16,000×g, 5 minutes, 25° C.) to thereby separate it into a solution containing CNT squeezed out of the gel (unadsorbed fraction) and the gel.

Figure 4:
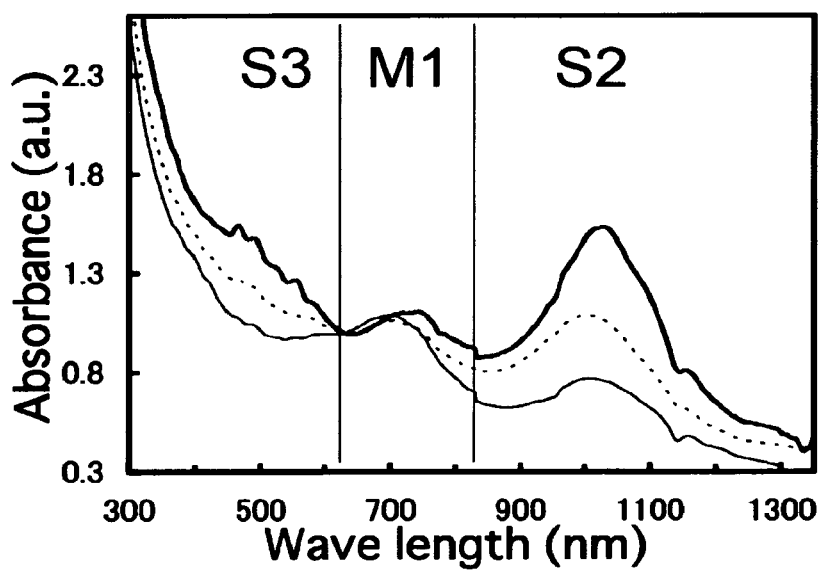
FIG. 4 This is a view showing photoabsorption spectra of CNT separated according to a freezing squeezing method (Example 3, Arc-CNT). The dotted line indicates before separation; the thin line indicates a unadsorbed fraction; and the thick line indicates an adsorbed fraction.

The photoabsorption spectral patterns of the unadsorbed fraction and the adsorbed fraction are shown in FIG. 4. In the drawing, "dotted line", "thin line" and "thick line" each show the spectrum before separation, unadsorbed fraction and adsorbed fraction, respectively. This Example clearly shows that, after separation according to a freezing squeezing method, the CNT adsorbed by the gel can be desorbed and collected not dissolving the gel.

Example 4

A CNT-containing gel was dipped in an eluent to separate it into CNT adsorbed by gel and an eluted CNT solution, and then the CNT adsorbed by gel was desorbed and collected with an aqueous DOC solution.

The process is the same as in Example 1 except that the step of [Separation according to Centrifugal Method] was changed to a step of [Separation according to Diffusion Method].

[Separation According to Diffusion Method]

The CNT-containing gel prepared in the above was ground finely, and about 0.5 ml thereof was transferred into a different vessel. 0.5 ml of an aqueous 1% SDS solution was added to it, and gently stirred for 1 hour. This was lightly centrifuged, and separated into the solution containing CNT diffused out of the gel (unadsorbed fraction) and the gel.

[Elution of CNT Adsorbed by Gel]

0.5 ml of an aqueous 1% SDS solution was added to the thus-separated, CNT-adsorbed gel, and gently stirred for 1 hour to wash the gel. After washed, the gel still adsorbed CNT. An aqueous 1% DOC solution (0.5 ml) was added to the gel and gently stirred whereby CNT were desorbed into a solution and were thus collected (adsorbed fraction).

Figure 5:
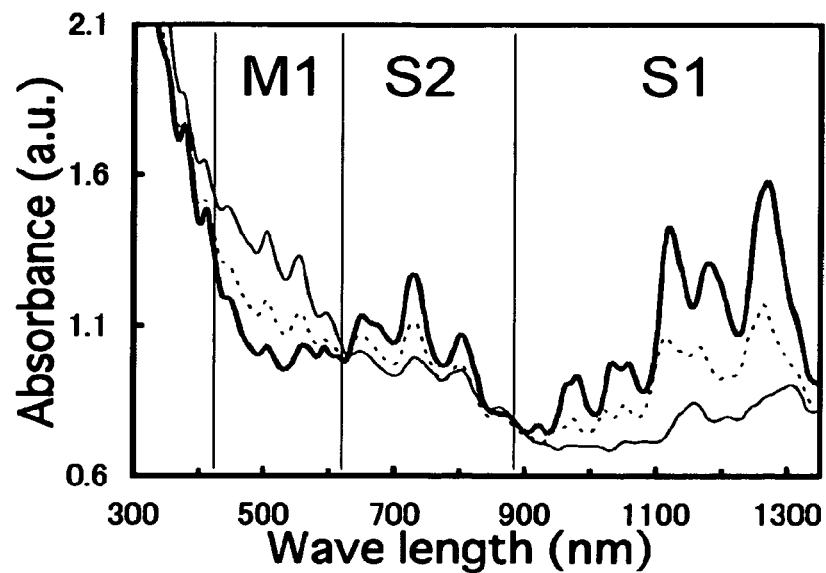
FIG. 5 This is a view showing photoabsorption spectra of CNT separated according to a diffusion method (Example 4, Hipco-CNT). The dotted line indicates before separation; the thin line indicates a unadsorbed fraction; and the thick line indicates an adsorbed fraction.

The photoabsorption spectral patterns of the unadsorbed fraction and the adsorbed fraction are shown in FIG. 5. In the drawing, "dotted line", "thin line" and "thick line" each show the spectrum before separation, unadsorbed fraction and adsorbed fraction, respectively. This Example clearly shows that, after separation according to a diffusion method, the CNT adsorbed by the gel can be desorbed and collected not dissolving the gel.

Example 5

This is the same diffusion method as in Example 4 except that a different type of CNT (Arc-CNT, by Meijo Nanocarbon, having a diameter of 1.4±0.1 nm) was used. The CNT adsorbed by the gel and the eluted CNT solution were separated, and then the CNT adsorbed by the gel was desorbed and collected with an aqueous DOC solution.

Figure 6:
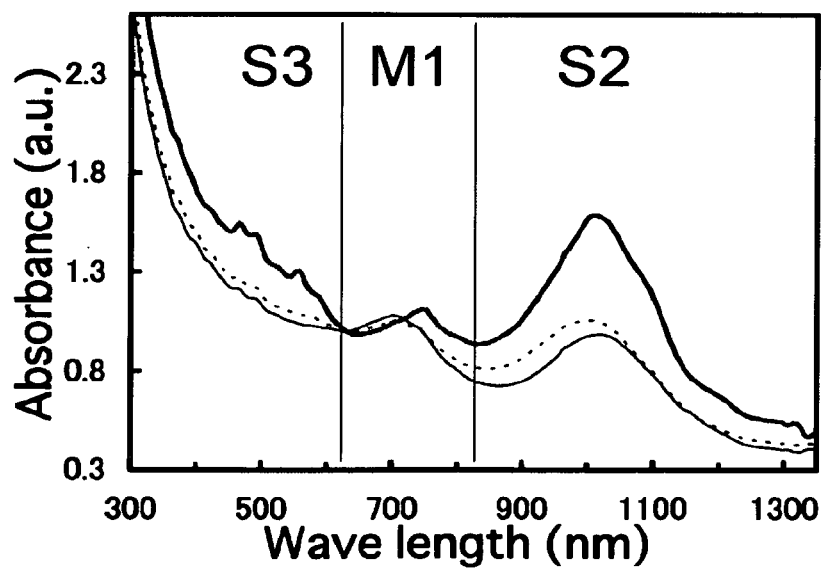
FIG. 6 This is a view showing photoabsorption spectra of CNT separated according to a diffusion method (Example 5, Arc-CNT). The dotted line indicates before separation; the thin line indicates a unadsorbed fraction; and the thick line indicates an adsorbed fraction.

The photoabsorption spectral patterns of the unadsorbed fraction and the adsorbed fraction are shown in FIG. 6. In the drawing, "dotted line", "thin line" and "thick line" each show the spectrum before separation, unadsorbed fraction and adsorbed fraction, respectively. This Example clearly shows that, even when a different type of CNT are used, the CNT adsorbed by the gel can be desorbed and collected not dissolving the gel.

Example 6

(1) [Separation According to Permeation Method—Batch Process]

An agarose gel not containing CNT was dipped in a CNT dispersion to thereby separate the dispersion into CNT adsorbed by the gel and a unadsorbed CNT solution, and then the CNT adsorbed by the gel were desorbed and collected with an aqueous sodium cholate (SC) solution.

In a microtube, about 100 µl of gel particles comprising 2% agarose were equilibrated with water, and the excessive water was removed. The CNT dispersion prepared in Example 1 was diluted 2 times with water, and 300 µl of the thus-diluted dispersion was added to the above gel, and gently stirred for 3 hours. This was lightly centrifuged and separated into a solution containing unadsorbed CNT (unadsorbed fraction) and gel particles.

[Elution of Adsorbed CNT from Gel]

Thus separated, the CNT-adsorbed gel was washed with 0.9 ml of water. The gel still adsorbed CNT. An aqueous 10% SC solution (0.4 ml) was added to the gel and gently stirred whereby CNT were desorbed into a solution and were thus collected (adsorbed fraction).

Figure 7:
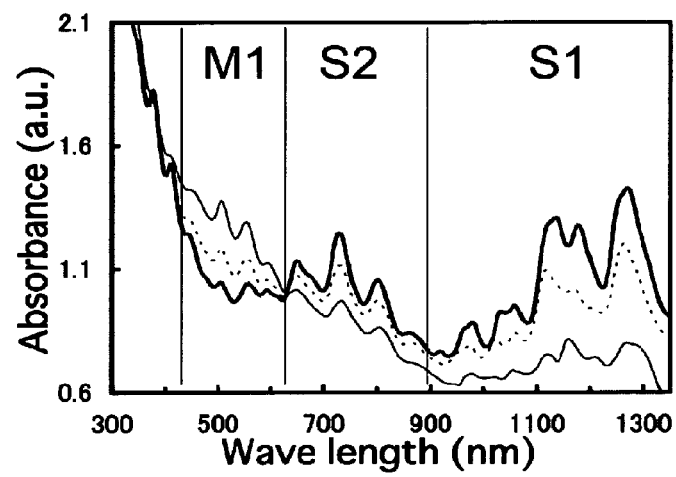
FIG. 7 This is a view showing photoabsorption spectra of CNT separated according to a permeation method (batch process) (Example 6-(1), Hipco-CNT). The dotted line indicates before separation; the thin line indicates a unadsorbed fraction; and the thick line indicates an adsorbed fraction.

The photoabsorption spectral patterns of the unadsorbed fraction and the adsorbed fraction are shown in FIG. 7. In the drawing, "dotted line", "thin line" and "thick line" each show the spectrum before separation, unadsorbed fraction and adsorbed fraction, respectively. This Example clearly shows that, after separated according to a permeation method, the CNT adsorbed by the gel can be desorbed and collected not dissolving the gel.

(2) [Separation According to Permeation Method—Continuous Process]

In the above experiment of permeation method, the steps of adsorption, washing and desorption were carried out continuously by feeding the CNT sample to the vessel filled with the gel.

[Adsorption and Elution to and from Gel]

Gel particles of 2% agarose were filled in a fluid-feedable vessel and equilibrated with an aqueous 2% SDS solution. A CNT dispersion (0.15 ml) was fed to the gel, and then aqueous 1% SDS solution (3 ml) was fed thereto. Through the operation, CNT adsorbed by the gel and CNT not adsorbed by the gel but passing through the gel (unadsorbed fraction) were separated from each other. The gel was washed with water (1 ml) applied thereto, and the adsorbed CNT were desorbed by the use of an aqueous solution containing any of various surfactants. As a result, the CNT adsorbed by the gel were desorbed and collected (adsorbed fraction). The eluent used here is an aqueous 1% solution of DOC, SC, sodium dodecylbenzenesulfonate (SDBS), Tween-20 or Triton X-100.

Figure 8:
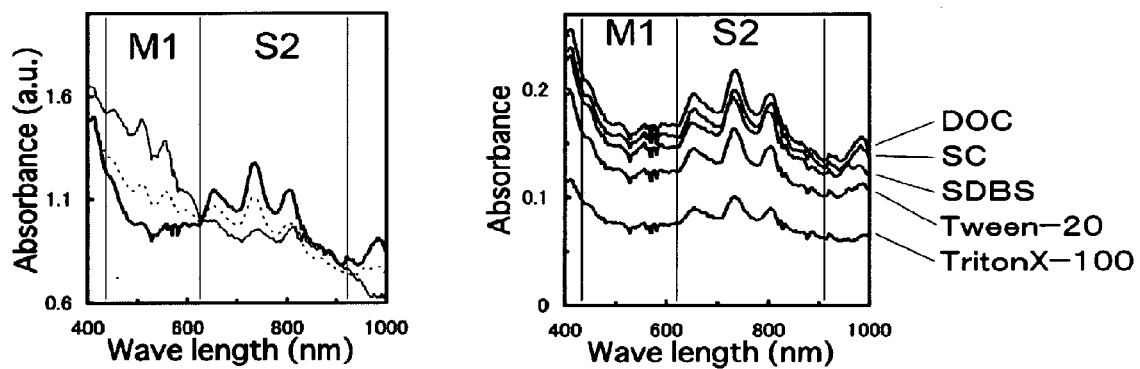
FIG. 8 This is a view showing photoabsorption spectra of CNT separated according to a permeation method (continuous process) (Example 6-(2), Hipco-CNT). The left side shows the results with sodium deoxycholate (DOC) in elution. The dotted line indicates before separation; the thin line indicates a unadsorbed fraction; and the thick line indicates an adsorbed fraction. The right side shows the results of adsorbed fractions with various surfactants in elution. These are DOC, sodium cholate (SC), sodium dodecylbenzenesulfonate (SDBS), Tween-20, Triton X-100 in that order from the top.

The photoabsorption spectral patterns of the unadsorbed fraction and the adsorbed fraction are shown in FIG. 8.

The left-side view shows the results using DOC for desorption. In the drawing, "dotted line", "thin line" and "thick line" each show the spectrum before separation, unadsorbed fraction and adsorbed fraction, respectively.

The right-side view shows the results of the adsorbed fraction for which various surfactants were used for desorption. In the drawing, the patterns are with DOC, SC, SDBS, Tween-20 and Triton X-100 in that order from the top.

This Example clearly shows collection of CNT in continuous permeation (adsorption) and desorption to and from gel.

Example 7

CNT adsorbed by the gel in Example 6-(2) were desorbed and separated through gradient elution with continuously changing the surfactant concentration in the eluent.

Figure 9:
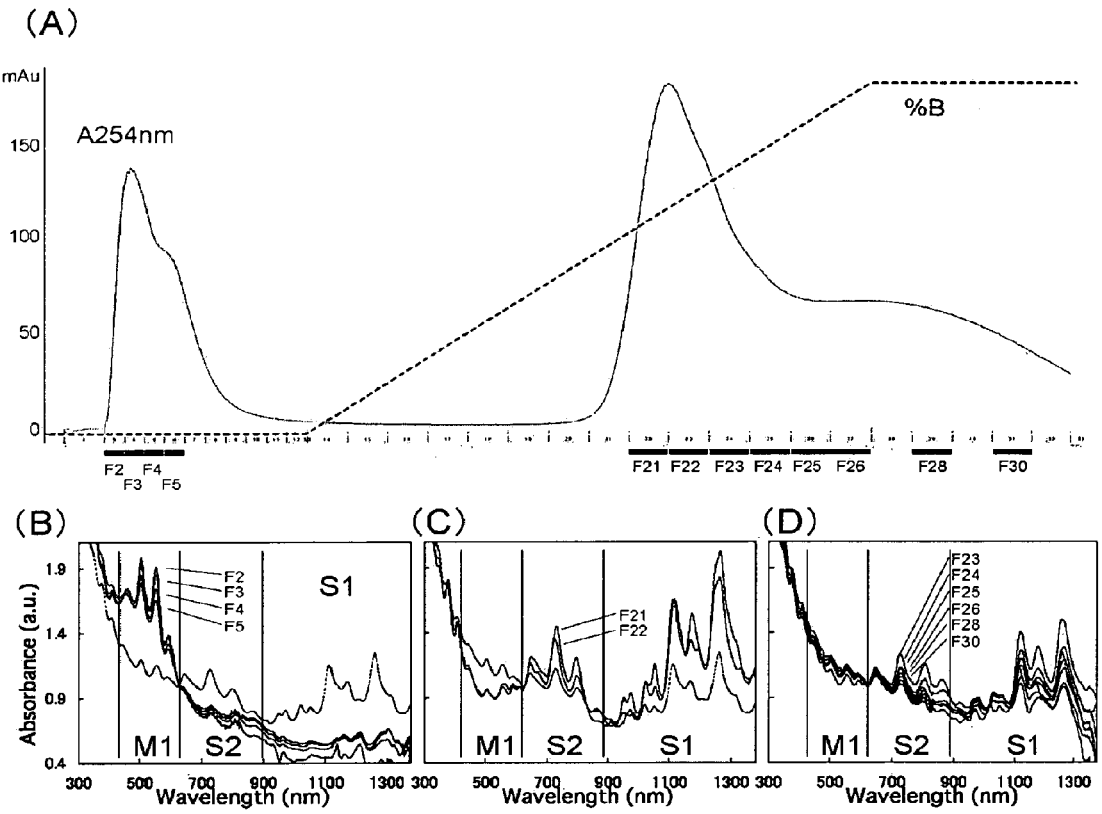
FIG. 9 This shows results of separation through gradient elution according to a permeation method (continuous process). (A) is a chromatogram. For CNT detection, used was a UV ray having a wavelength of 256 nm. (B) to (D) are photoabsorption spectra. The spectra of the unseparated CNT are shown by dotted lines.

A column was filled with about 2.25 ml of crosslinked 4% agarose gel beads (Sepharose 4FF, by GE Healthcare). Using this in a chromatography apparatus (AKTAprime, by GE Healthcare), the above CNT were separated. 1% SDS (liquid A) was used from the initial developer solution; and 1% DOC (liquid B) was used for the eluent. The column was fully equilibrated with the liquid A, then 0.5 ml of the CNT dispersion was applied thereto. Next, 5 ml of the liquid A was applied to it, and the fraction not adsorbed by the gel was collected. Next, the blend ratio of the liquid B to the liquid A was linearly changed from 0% to 100%, and the CNT adsorbed by the gel were eluted and collected. The obtained chromatogram is shown in FIG. 9(A). The photoabsorption spectral patterns are separately shown as the fractions not adsorbed by the gel (F2 to F5, FIG. 9(B)), as the fractions eluted in early stages with DOC (F21, F22, FIG. 9(C)), and as the fractions eluted later (F23 to F26, F28, F30, FIG. 9(D)). In the fractions not adsorbed by the column (F2 to F5, FIG. 9(B)), metallic CNT were concentrated. On the other hand, the CNT adsorbed by the gel were eluted with increasing the concentration of the eluent. With that, high-purity semiconducting CNT were eluted first (F21, F22, FIG. 9(C)), and CNT of which the ratio of metallic/semiconducting changed little from that of CNT before separation were collected later. To that effect, continuously changing the concentration of the eluent makes it possible to separate the fractions of high-purity semiconducting CNT and the fractions of low-purity semiconducting CNT from the CNT adsorbed by the gel. In that manner, it is possible to improve the purity of the semiconducting CNT by continuously changing the elution condition.

Example 8

The CNT adsorbed by a gel were desorbed through separation with a column, in which the surfactant concentration in the eluent was stepwise changed. Use of a strictly-controlled eluent concentration makes it possible to separate metallic/ semiconducting CNT from each other and simultaneously to separate semiconducting CNT having a different thickness.

[Preparation of CNT Dispersion]

An aqueous 2% SDS solution (100 ml) was added to Hipco-CNT (100 mg). The solution was ultrasonicated for 20 hours, using a tip-type ultrasonic homogenizer (Sonifire, by Branson, having a tip diameter of 0.5 inches) at a power of 20 W/cm$^2$, with cooling in cold water. The dispersion obtained through ultrasonication was centrifuged (197,000×g, 15 minutes), and the supernatant (80%) was collected. This is a CNT dispersion.

[Preparation of Column and Separation Through it]

2% Agarose gel beads (Sepharose 2B, by GE Healthcare) were filled into a plastic column (length 8 cm, diameter 1.5 cm) so that the height of the filled gel could be about 3.5 cm. The column was equilibrated with an aqueous 2% SDS solution, and the CNT dispersion (5 ml) was added to the column, then an aqueous 2% SDS solution was added thereto, and the metallic CNT were collected. After the aqueous 2% SDS solution (about 50 ml) was applied to the column, the solution was transparent and no CNT existed therein. At that time, the gel in the column was green peculiar to the semiconducting Hipco-CNT. Next, from 2 to 3 ml of an aqueous DOC solution having a concentration of 0.05% was added to the column for elution of the semiconducting CNT adsorbed by the gel, and the fraction was called F1. Further, from 2 to 3 ml of the same solution was added thereto, and this operation was repeated until semiconducting CNT could be eluted no more; and in that manner, 12 fractions in total were collected (F1 to F12). Next, the DOC solution was stepwise increased to 0.1%, 0.25%, 0.5% and 2%, and the same operation was repeated and the fractions were collected.

[Photoabsorption Spectrometry]

Figure 10:
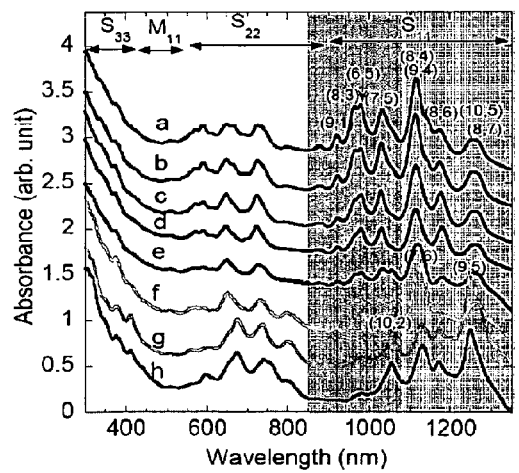
FIG. 10 This shows photoabsorption spectra of fractions in column separation in which the eluent concentration was stepwise changed. a to d indicate the 1st, 3rd, 6th and 9th fractions (F1, F3, F6, F9) in elution with 0.05% DOC. e indicates a fraction in 0.1% DOC elution; f indicates a fraction in 0.25% DOC elution; g indicates a fraction in 0.5% DOC elution; h indicates a fraction in 2% DOC elution.

The photoabsorption spectral patterns of the obtained fractions are shown in FIG. 10. The CNT photoabsorption spectrum is a set of CNT absorptions of plural types of chirality (single structure defined by chiral index). The data in $S_{11}$ (this has the same meaning as the above-mentioned S1) derived from semiconducting CNT are compared with each other. There is seen a rough tendency that the absorption on the high-energy side (short wavelength) is derived from CNT having a small diameter, while the absorption on the low-energy side (long wavelength) is derived from CNT having a large diameter. The $S_{11}$ absorptions of the fractions eluted with 0.05% DOC (F1, F3, F6, F9) are compared with each other, and the spectral profiles gradually changed. (FIG. 10, a to d). This indicates that, when a suitable eluent solution is set, then different types of CNT can be separated at a constant eluent concentration. Further, the fractions collected with an eluent having a varying DOC concentration of 0.1%, 0.25%, 0.5% and 2% gave greatly changing spectral profiles (FIG. 10, e to h—at these concentrations, there is no significant difference in the spectrum between the fractions eluted at the same concentration, and only a typical one is shown). $S_{11}$ is divided into a region on the short wavelength side (850 to 1100 nm) and a region on the long wavelength side (1100 to 1350 nm); and it has become clear in each region that with the increase in the DOC concentration in the eluent, semiconducting CNT having an absorption on the short wavelength side and having a small diameter tend to be eluted first, and semiconducting CNT having an absorption on the long wavelength side and having a large diameter tend to be eluted later.

[Fluorescent Spectrometry]

Figure 11:
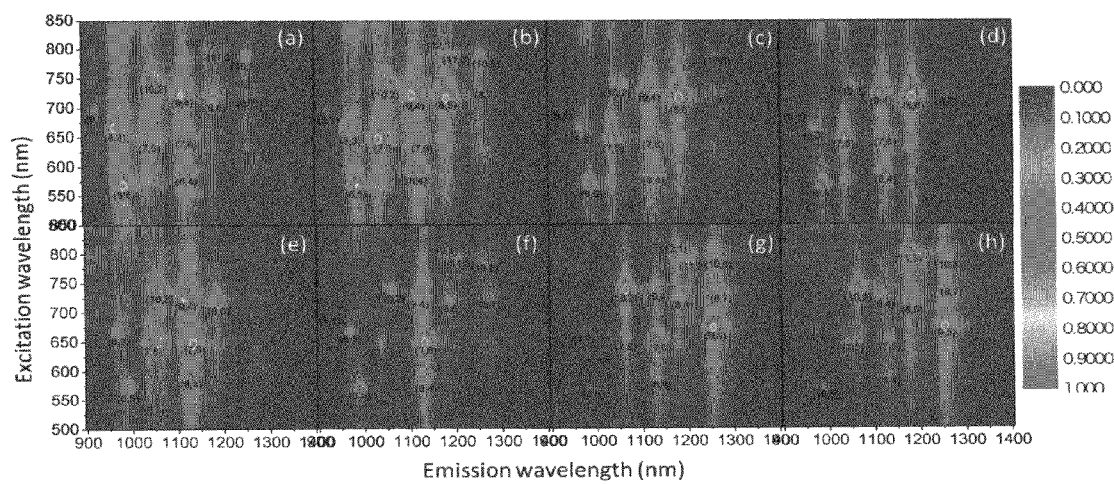
FIG. 11 This shows results of fluorescent spectrometry. The fluorescence intensity at the fluorescent wavelength (horizontal axis) to the excitation wavelength (vertical axis) is shown as a contour map. In these, the intensity increases in the order of from lighter spots to dark spots relative to the darker background (for which the scale in the right-hand view is referred to). To the side of the main spots, the corresponding chiral index is given. The sings of a to h corresponds to those in FIG. 10.

In the above photoabsorption spectrometry, the absorptions of CNT having a different chirality but having a near diameter overlap, and therefore single chirality change is difficult to identify. A method of fluorescent spectrometry with changing the excitation wavelength makes it possible to individually detect the chirality of semiconducting CNT. The result of fluorescent spectrometry is shown in FIG. 11. The samples are the same as those used for the photoabsorption spectrometry in FIG. 10. In FIG. 11, the vertical axis indicates the excitation wavelength; the horizontal axis indicates the fluorescence wavelength; and the fluorescence intensity is expressed by a contour line map with varying color densities. The appearing spots are the fluorescence derived from single semiconducting CNT. The relative ratio of the fluorescence intensity of each fraction is compared between the fractions, whereby the change in the relative amount of CNT of each chirality can be known. The order of the eluted chiralities was (9,1), (8,3), (6,5), (9,4), (7,5), (8,4), (8,6), (7,6), (10,5), (8,7), (10,2), (9,5). Strictly, this order is not in the order of diameter; however, when these are grouped into two, "(9,1), (8,3), (6,5), (7,5), (10,2)", and "(9,4), (8,4), (8,6), (7,6), (10,5), (8,7), (9,5)", then they are in order of from CNT having a smaller diameter to CNT having a larger diameter. The results well correspond to the result of the above-mentioned photoabsorption spectrometry (FIG. 10).

The above results indicate that in column separation with a gel, not only metallic CNT and semiconducting CNT can be separated but also semiconducting CNT can be separated depending on the difference in the diameter thereof by controlling the condition of the eluent to be used.

Example 9

In column separation, the CNT adsorbed by the gel was desorbed with an eluent containing the same type of surfactant as that used for separation, in which the concentration of the surfactant was stepwise increased.

[Preparation of CNT Dispersion]

An aqueous 1% SDS solution (100 ml) was added to Hipco-CNT (100 mg). The solution was ultrasonicated for 9 hours, using a tip-type ultrasonic homogenizer (Sonifire, by Branson, having a tip diameter of 0.5 inches) at a power of 30%, with cooling in cold water. The dispersion obtained through ultrasonication was centrifuged (505,000×g, 1 hour), and the supernatant (80%) was collected. This is a CNT dispersion.

[Preparation of Column and Separation Through it]

Agarose gel (about 4 ml) was filled into a plastic column. The column was equilibrated with an aqueous 1% SDS solution, and the CNT dispersion (0.2 ml) was added to the column, then an aqueous 1% SDS solution was added thereto, and the unadsorbed fraction was collected. Next, an aqueous 2% SDS solution (about 5 ml) was added to it, and the eluted CNT was collected (2% SDS eluate fraction). Subsequently, an aqueous 5% SDS solution (about 5 ml) was added, and the eluted CNT was collected (5% SDS eluate fraction).

Figure 12:
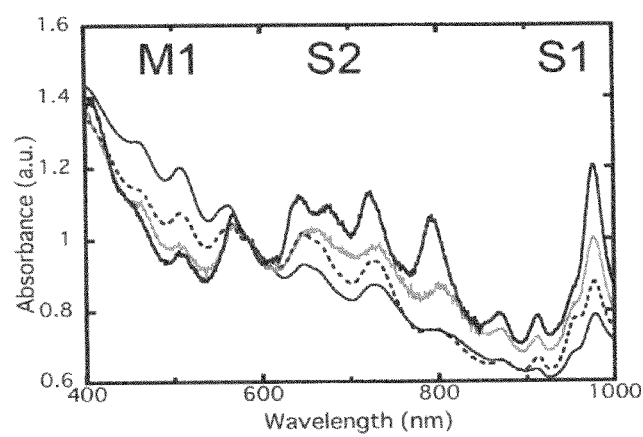
FIG. 12 This shows photoabsorption spectra of CNT (Example 9, Hipco-CNT) separated using an aqueous SDS solution as the eluent according to a permeation method (continuous process), showing the results of elution with an aqueous 2% SDS solution followed by elution with an aqueous 5% SDS solution. The dotted line indicates before separation; the thin line indicates a unadsorbed fraction, the gray thick line indicates a 2% SDS eluate fraction; and the black thick line indicates a 5% SDS eluate fraction.

The results of photoabsorption spectrometry of each fraction are shown in FIG. 12.

In the drawing, "dotted line", "thin line", "gray thick line" and "black thick line" each indicate the spectrum before separation, the spectrum of the unadsorbed fraction, the spectrum of the 2% SDS eluate fraction and the spectrum of the 5% SDS eluate fraction, respectively. It is known that the semiconductor CNT was eluted in both the 2% SDS eluate fraction and the 5% SDS eluate fraction.

This Example demonstrates the desorption of CNT adsorbed by gel, using an eluent that contains the same type of surfactant as that used for separation.

The invention claimed is:
1. A method for separating and collecting metallic carbon nanotubes and semiconducting carbon nanotubes, which comprises:
   centrifuging a carbon nanotubes-containing gel with a centrifuge to obtain (1) a solution fraction containing metallic carbon nanotubes in the solution eluted from the gel through centrifugation, and (2) a gel fraction containing semiconducting carbon nanotubes in the gel compressed by centrifugation, separating (1) the solution fraction containing metallic carbon nanotubes and (2) the gel fraction containing semiconducting carbon nanotubes from each other, and adding an eluent to (2) the gel fraction containing semiconducting carbon nanotubes to thereby elute the semiconducting carbon nanotubes from the gel adsorbing the semiconducting carbon nanotubes.

2. A method for separating and collecting metallic carbon nanotubes and semiconducting carbon nanotubes, which comprises:

freezing a carbon nanotubes-containing gel, then squeezing the gel after thawed, to separate it into (1) a solution containing metallic carbon nanotubes in the solution eluted from the gel, and (2) a gel containing semiconducting carbon nanotubes in the squeezed gel, and adding an eluent to (2) the gel containing semiconducting carbon nanotubes to thereby elute the semiconducting carbon nanotubes from the gel adsorbing the semiconducting carbon nanotubes.

3. A method for separating and collecting metallic carbon nanotubes and semiconducting carbon nanotubes, which comprises:

dipping a carbon nanotubes-containing gel in a solution to obtain (1) a metallic carbon nanotubes-containing solution formed by diffusing and eluting metallic carbon nanotubes into the solution from the gel, and (2) a semiconducting carbon nanotubes-containing gel, then separating (1) the metallic carbon nanotubes-containing solution and (2) the semiconducting carbon nanotubes-containing gel from each other, and adding an eluent to (2) the semiconducting carbon nanotubes-containing gel to thereby elute the semiconducting carbon nanotubes from the gel adsorbing the semiconducting carbon nanotubes.

4. A method for separating and collecting metallic carbon nanotubes and semiconducting carbon nanotubes, which comprises:

mixing a gel and a carbon nanotube dispersion to thereby make semiconducting carbon nanotubes permeate into the gel and concentrate metallic carbon nanotubes in solution, then taking out and separating the metallic carbon nanotubes-containing solution from the carbon nanotubes-containing gel, and adding an eluent to the carbon nanotubes-containing gel, thereby eluting the semiconducting carbon nanotubes from the gel adsorbing the semiconducting carbon nanotubes.

5. A method for separating and collecting metallic carbon nanotubes and semiconducting carbon nanotubes, which comprises:

making a carbon nanotube dispersion pass through a gel to thereby make the gel adsorb semiconducting carbon nanotubes, then eluting and separating the unadsorbed metallic carbon nanotubes, and adding an eluent to the gel from which the solution has been separated, thereby eluting the semiconducting carbon nanotubes from the gel adsorbing the semiconducting carbon nanotubes.

6. The method for separating and collecting metallic carbon nanotubes and semiconducting carbon nanotubes as claimed in any one of claims 1 to 5, wherein in the elution step of eluting the semiconducting carbon nanotubes from the gel, the eluent contains a surfactant of a type that differs from that of the surfactant used for separation.

7. The method for separating and collecting metallic carbon nanotubes and semiconducting carbon nanotubes as claimed in claim 6, wherein the surfactant contained in the eluent is sodium deoxycholate, sodium cholate, sodium dodecylbenzenesulfonate, Tween-20 or Triton X-100.

8. The method for separating and collecting metallic carbon nanotubes and semiconducting carbon nanotubes as claimed in any one of claims 1 to 5, wherein in the elution step of eluting the semiconducting carbon nanotubes from the gel, the eluent contains a surfactant of the same type as that of the surfactant used for separation.

9. The method for separating and collecting metallic carbon nanotubes and semiconducting carbon nanotubes as claimed in claim 8, wherein the surfactant contained in the eluent has a higher concentration than that of the surfactant used for separation.

10. The method for separating and collecting metallic carbon nanotubes and semiconducting carbon nanotubes as claimed in any one of claims 1 to 3, wherein the carbon nanotubes-containing gel is prepared by previously dispersing and solubilizing carbon nanotubes with a surfactant, and then ultrasonically treating them to make the carbon nanotubes exist in the gel in a dispersed and isolated state.

11. The method for separating and collecting metallic carbon nanotubes and semiconducting carbon nanotubes as claimed in claim 4 or 5, wherein the carbon nanotube dispersion is prepared by previously dispersing and solubilizing carbon nanotubes with a surfactant, and then ultrasonically treating them to make the carbon nanotubes dispersed and isolated in the dispersion.

12. The method for separating and collecting metallic carbon nanotubes and semiconducting carbon nanotubes as claimed in claim 10, wherein the surfactant is an anionic surfactant or an amphoteric surfactant.

13. The method for separating and collecting metallic carbon nanotubes and semiconducting carbon nanotubes as claimed in claim 12, wherein the anionic surfactant is alkyl sulfate salt, sodium dodecanesulfonate, dodecanoylsarcosine sodium, sodium dodecanoate, or sodium cholate.

14. The method for separating and collecting metallic carbon nanotubes and semiconducting carbon nanotubes as claimed in claim 13, wherein the alkyl sulfate salt is sodium dodecyl sulfate, sodium decyl sulfate or sodium tetradecyl sulfate.

15. The method for separating and collecting metallic carbon nanotubes and semiconducting carbon nanotubes as claimed in claim 12, wherein the amphoteric surfactant is n-dodecylphosphocholine.

16. The method for separating and collecting metallic carbon nanotubes and semiconducting carbon nanotubes as claimed in claim 11, wherein the surfactant is an anionic surfactant or an amphoteric surfactant.

17. The method for separating and collecting metallic carbon nanotubes and semiconducting carbon nanotubes as claimed in claim 16, wherein the anionic surfactant is alkyl sulfate salt, sodium dodecanesulfonate, dodecanoylsarcosine sodium, sodium dodecanoate, or sodium cholate.

18. The method for separating and collecting metallic carbon nanotubes and semiconducting carbon nanotubes as claimed in claim 17, wherein the alkyl sulfate salt is sodium dodecyl sulfate, sodium decyl sulfate or sodium tetradecyl sulfate.

19. The method for separating and collecting metallic carbon nanotubes and semiconducting carbon nanotubes as claimed in claim 16, wherein the amphoteric surfactant is n-dodecylphosphocholine.

\* \* \* \* \*